(12) United States Patent
Kuba

(10) Patent No.: US 9,140,540 B2
(45) Date of Patent: Sep. 22, 2015

(54) COORDINATE DETECTOR AND ELECTRONIC INFORMATION BOARD SYSTEM

(71) Applicant: Yasuhiro Kuba, Kanagawa (JP)

(72) Inventor: Yasuhiro Kuba, Kanagawa (JP)

(73) Assignee: Ricoh Company, LTD., Tokyo (JP)

( * ) Notice: Subject to any disclaimer, the term of this patent is extended or adjusted under 35 U.S.C. 154(b) by 27 days.

(21) Appl. No.: 14/096,520

(22) Filed: Dec. 4, 2013

(65) Prior Publication Data
US 2014/0160494 A1    Jun. 12, 2014

(30) Foreign Application Priority Data

Dec. 7, 2012  (JP) ................................. 2012-267889
Oct. 28, 2013  (JP) ................................. 2013-223181

(51) Int. Cl.
*G01B 11/00* (2006.01)
*G06F 3/042* (2006.01)

(52) U.S. Cl.
CPC ............ *G01B 11/002* (2013.01); *G06F 3/0421* (2013.01); *G06F 3/0428* (2013.01)

(58) Field of Classification Search
USPC ........... 356/614–625; 345/173, 175, 177–179
See application file for complete search history.

(56) References Cited

U.S. PATENT DOCUMENTS

| | | | |
|---|---|---|---|
| 6,352,351 B1 | 3/2002 | Ogasahara et al. | |
| 6,504,532 B1 | 1/2003 | Ogasahara et al. | |
| 6,518,959 B1 | 2/2003 | Ito et al. | |
| 7,034,809 B2 * | 4/2006 | Hasegawa ..................... 345/173 |
| 7,751,671 B1 * | 7/2010 | Newton et al. ................ 385/134 |
| 8,055,022 B2 * | 11/2011 | Morrison et al. ............. 382/103 |
| 8,629,989 B2 * | 1/2014 | Kobayashi et al. ........... 356/622 |
| 8,851,687 B2 * | 10/2014 | Miyao et al. .................. 359/530 |
| 8,902,193 B2 * | 12/2014 | Hansen et al. ................ 345/175 |
| 2001/0028344 A1 | 10/2001 | Iwamoto et al. | |
| 2005/0248539 A1 | 11/2005 | Morrison et al. | |
| 2006/0176418 A1 | 8/2006 | Anderson et al. | |
| 2009/0146972 A1 | 6/2009 | Morrison et al. | |
| 2010/0253637 A1 | 10/2010 | Lieberman et al. | |
| 2011/0074674 A1 | 3/2011 | Walberg et al. | |
| 2011/0242006 A1 | 10/2011 | Thompson et al. | |
| 2011/0304535 A1 | 12/2011 | Machii | |
| 2012/0044211 A1 | 2/2012 | Hsu et al. | |
| 2012/0105376 A1 | 5/2012 | Park et al. | |
| 2013/0135346 A1 | 5/2013 | Sakuramata et al. | |
| 2015/0009182 A1 * | 1/2015 | Kuba ............................ 345/175 |

FOREIGN PATENT DOCUMENTS

| | | |
|---|---|---|
| EP | 1132804 A1 | 9/2001 |
| JP | 11-085399 | 3/1999 |

(Continued)

OTHER PUBLICATIONS

Extended European Search Report dated Mar. 7, 2014 issued in corresponding European Application No. 13195883.7.

*Primary Examiner* — Sang Nguyen
(74) *Attorney, Agent, or Firm* — Harness, Dickey & Pierce, P.L.C.

(57) ABSTRACT

A coordinate detector includes a pair of light sensor units disposed on a side of a display part having a display surface to be touched by a target to be detected, optical reflective members respectively disposed on remaining three sides of the display part, and a sensor position adjusting unit configured to adjust a rolling direction of the light sensor unit with respect to the optical reflective members. When the target touches the display surface, coordinates of the target are detected based on light reflected off the optical reflective members that is received by the light sensor units.

8 Claims, 14 Drawing Sheets

(56) References Cited

FOREIGN PATENT DOCUMENTS

| JP | 2001-265517 | 9/2001 |
| JP | 2003091358 A | 3/2003 |
| JP | 4143759 | 9/2008 |
| JP | 4340302 | 10/2009 |
| JP | 2013-131204 | 7/2013 |

* cited by examiner

FIG.6
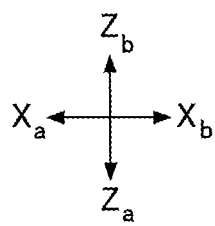
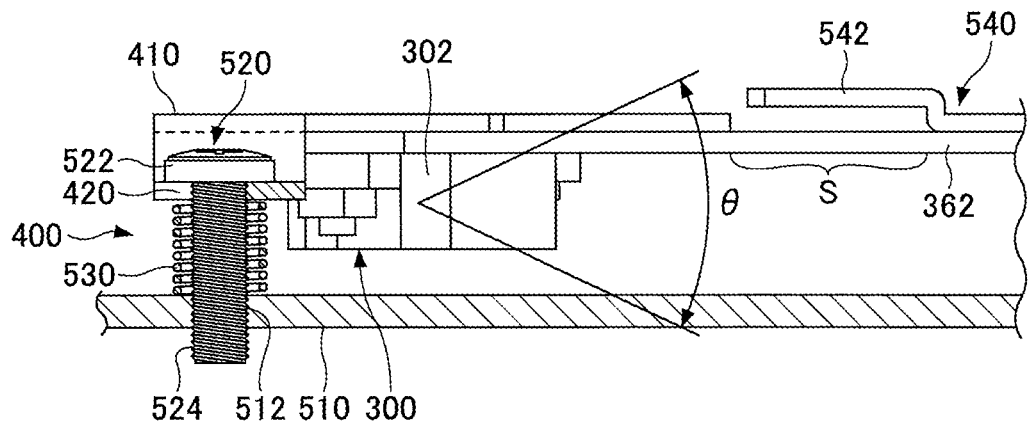

COORDINATE DETECTOR AND ELECTRONIC INFORMATION BOARD SYSTEM

BACKGROUND OF THE INVENTION

1. Field of the Invention

The disclosures herein generally relate to a coordinate detector and an electronic information board system.

2. Description of the Related Art

Recently, electronic information boards, so-called electronic whiteboards or interactive white boards (IWB), have progressively been developed. This type of the electronic information board may, for example, generally include an image display device having a large screen composed of a flat panel such as a liquid crystal panel or a plasma panel (e.g., a screen having a dimension range in a diagonal direction of 40 to 60 inch), a touch panel (a coordinate detector) configured to detect coordinates of a position touched on a display surface of the image display device, and a control device configured to display various types of images (images including characters, numbers, and graphics) written on the display surface of the image display device based on coordinate data output from the coordinate detector.

Further, the electronic information board may be connected to a personal computer (PC). Such electronic information board connected to the PC may be able to enlarge an image displayed on the PC to display the enlarged image on the electronic board, which may be used for the presentation in a conference.

In addition, an electronic information board system includes a function to superpose hand-written graphics written by a pen-shaped input device on the image of the display surface by allowing the pen-shaped input device (a detection target) to touch the touch panel, or a function to incorporate an image of the PC to superpose hand-written graphics written by the pen-shaped input device on the image incorporated from the PC.

Further, an example of the coordinate detector disposed in the electronic information board system may be configured to include a pair of light sensor units disposed at opposite end corners of one side of a frame enclosing four sides of a display part, and three optical reflective members disposed on respective side walls perpendicular to the display surface of the remaining three sides of the frame. In the coordinate detector, light (infrared radiation) emitted from the pair of the light sensor units is applied to two optical reflective members facing each other at a predetermined angle out of the three optical reflective members disposed on the remaining three sides of the frame. Respective attached positions and attached angles of the two light sensor units are determined such that the pair of the two light sensor units receives light reflected off each of the two optical reflective members. In this configuration, when the pen-shaped input device touches the display surface, light passing through the touched position is blocked off and not received by the light sensor units. At this moment, the coordinate positions are computed by the triangulation method based on the optical angles.

RELATED ART DOCUMENTS

Patent Document

Patent Document 1: Japanese Patent No. 4340302

However, the electronic information board system may receive vibrations while the electronic information board system is transported. In this case, the attached positions and attached angles of the two light sensor units may slightly be shifted. For example, in a case of a 55 inch display part, the distance between each of the light sensor units and a corresponding one of the reflective members is approximately 1400 mm along a diagonal. Hence, when the attached position of the light sensor unit is shifted by one degree, the distance of light emitted from the optical sensor to the optical reflective member (a light reaching position) may approximately be shifted by 24 mm along the diagonal. This indicates that part of the light emitted from the optical sensors may deviate from the optical reflective members to interfere with the detection of the coordinates of the light reaching positions in that area. This kind of drawback may, for example, be resolved by increasing a height dimension of each the optical reflective members (i.e., a width dimension in a front-rear direction with respect to the vertically disposed display surface), or increasing the size of each of the light sensor units. However, this may inevitably result in an increase in the size of a bezel (a cover member) enclosing the display part.

Further, in the above-described coordinate detector, since accuracy in attaching the optical units is substantially high, accuracy in dimensions of each of the components becomes relatively high. Hence, an additional process for securing the attached positions of the components may need to be carried out, which may degrade production efficiency while increasing production cost.

SUMMARY OF THE INVENTION

Accordingly, it is a general object in one embodiment of the present invention to provide a novel and useful coordinate detector and electronic information board system having the coordinate detector, in which the limitations described above may be eliminated.

According to one aspect of the embodiment, there is provided a coordinate detector that includes a pair of light sensor units disposed on a side of a display part having a display surface to be touched by a target to be detected; optical reflective members respectively disposed on remaining three sides of the display part; and a sensor position adjusting unit configured to adjust a rolling direction of the light sensor unit with respect to the optical reflective members. In the coordinate detector, when the target touches the display surface, coordinates of the target are detected based on light reflected off the optical reflective members that is received by the light sensor units.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

Other objects and further features of the present invention will be apparent from the following detailed description when read in conjunction with the accompanying drawings.

BRIEF DESCRIPTION OF THE DRAWINGS

FIG. 6 is a diagram illustrating the sensor position adjusting mechanism viewed from its bottom side;

DETAILED DESCRIPTION OF THE PREFERRED EMBODIMENTS

Figure 1:
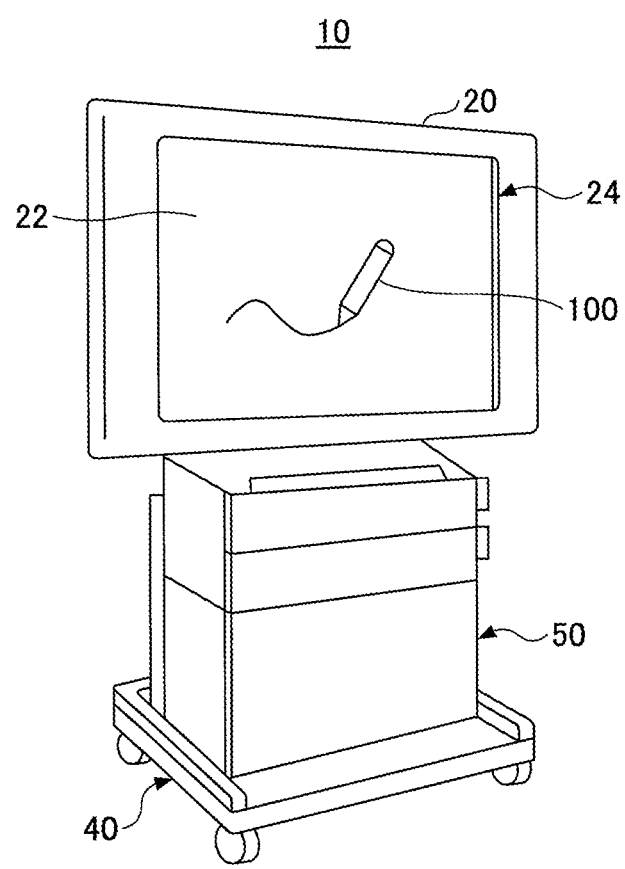
FIG. 1 is a perspective diagram illustrating an electronic information board system to which a coordinate detector according to a first embodiment is applied.

In the following, preferred embodiments of the present invention will be described with reference to the accompanying drawings. In the drawings, identical components are designated by the same reference numerals, and duplicated descriptions thereof will be omitted.

In the following, embodiments of the present invention will be described with reference to the accompanying drawings.
Configuration of Electronic Information Board System FIG. 1 is a perspective diagram illustrating an electronic information board system to which a pen-shaped input device according to a first embodiment is applied. As illustrated in FIG. 1, an electronic information board system 10 includes a display part 20, a stand 40, and an apparatus housing part 50. The display part 20 is formed of a flat panel such as a liquid crystal panel or a plasma panel. A display surface 22 configured to display an image, and a coordinate detector (i.e., a touch panel) 24 are formed on a surface of a housing of the display part 20.

Further, the electronic information board system 10 may allow a tip of a dedicated pen-shaped input device (a detection target) 100 to touch the display surface 22 to write characters or graphics.

The pen-shaped input device 100 transmits detected writing detective signals as radio signals when touching the display surface 22 with its tip. The display part 20 displays characters or graphics written at the coordinate positions detected by the coordinate detector 24 when detecting the writing detective signals transmitted from the pen-shaped input device 100.

Further, the pen-shaped input device 100 transmits detected erasing detective signals as radio signals when touching the display surface 22 with its tail. The display part 20 displays images of the characters or graphics written at the coordinate positions detected by the coordinate detector 24 that are erased from the display surface 22 when detecting the erasing detective signals transmitted from the pen-shaped input device 100.

The apparatus housing part 50 is configured to house various types of apparatuses such as later-described controller, printer, video disk apparatus, and the like. Further, the apparatus housing part 50 is configured to house a keyboard 30 used for performing input operations on the upper surface of the apparatus housing part 50.
Coordinate Detecting Method Performed by Coordinate Detector 24

Figure 2:
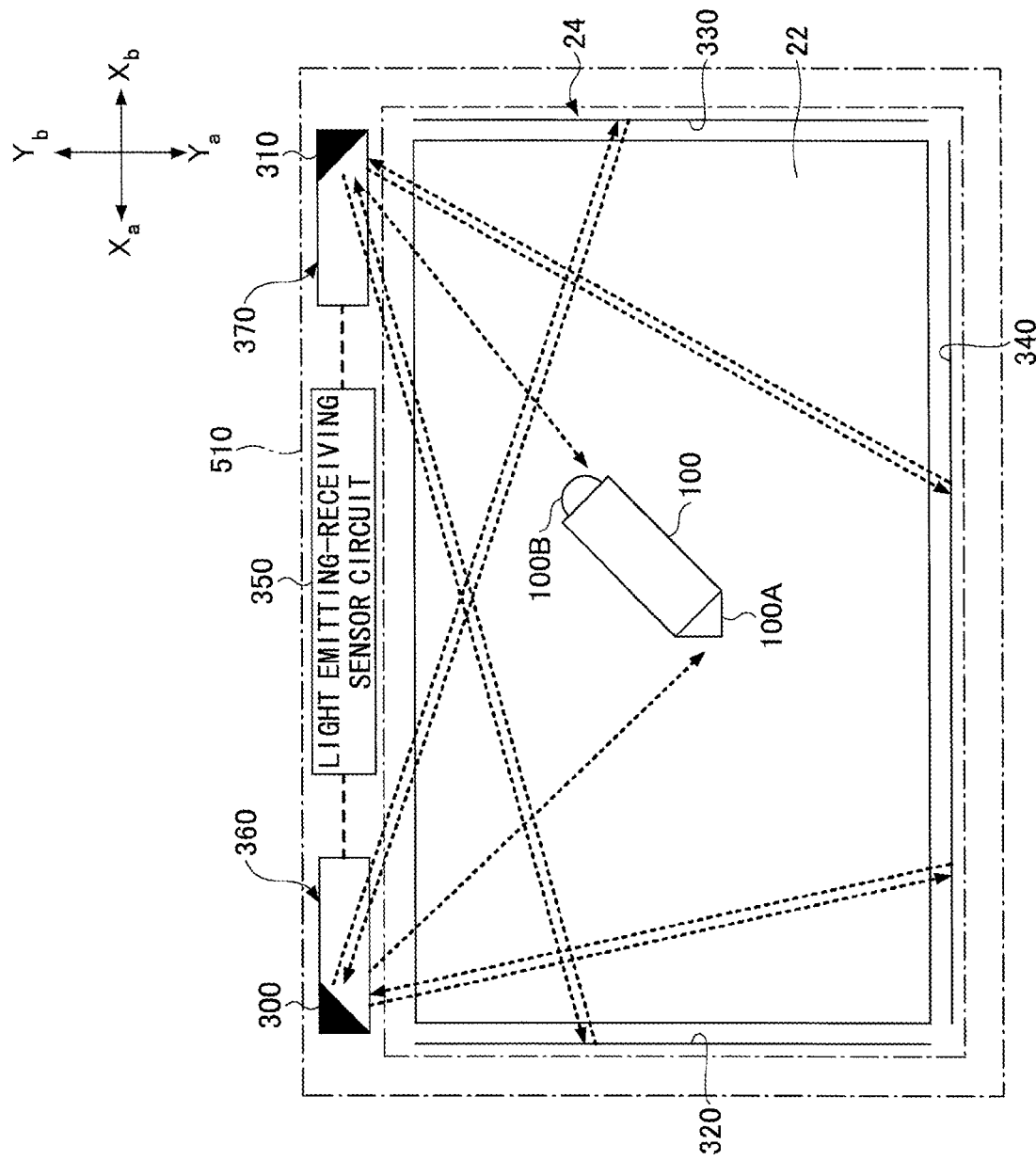
FIG. 2 is a schematic diagram illustrating a configuration of the coordinate detector.

FIG. 2 is a diagram illustrating a configuration of the coordinate detector 24 configured to detect coordinate positions. As illustrated in FIG. 2, the coordinate detector 24 includes a rectangular shaped frame 510 (indicated by dash-dot lines in FIG. 2) configured to enclose four sides of the display surface 22 of the display part 20. Further, the coordinate detector 24 includes a pair of first and second light sensor units 360 and 370 disposed on respective opposite ends of an upper one of sides of the frame 510, and reflectors 320, 330, and 340 disposed one on each of the remaining three sides.

The first and the second light sensor units 360 and 370 include first and second light emitting-receiving sensors 300 and 310, respectively. The first and the second light sensor units 360 and 370 are approximately disposed on left and right corners of the frame 510 located frontward with respect to the upper side of the display surface 22. Note that the light sensor units 360 and 370 are disposed such that the light emitting-receiving sensors 300 and 310 may be adjusted by a later-described sensor position adjusting mechanism 400 (see FIG. 5) in their rolling directions (i.e., Za-Zb direction in FIG. 6).

The reflectors (optical reflective members) 320, 330, and 340 are disposed on the remaining three sides (i.e., left, right and lower sides) of the display surface 22. In addition, the reflectors 320, 330, and 340 are disposed such that the reflectors 320, 330, and 340 linearly project forward in X and Y directions with a width range of 7 to 10 mm from the respective left, right, and lower sides of the display surface 22. Hence, when a detecting target such as the pen-shaped input device 100 is present in a plane (i.e., on the display surface 22) between the light emitting-receiving sensors 300 and 310, and the reflectors 320, 330 and 640, the light emitting-receiving sensors 300 and 310 will not receive reflected light of the coordinate position of the detecting target.

The first light emitting-receiving sensor 300 disposed on the upper left corner emits infrared radiation as coordinate detection light in parallel with the display surface 22 with respect to vertical surfaces. In this case, the emitting direction of the infrared radiation covers entire areas of the right reflector 330 and the lower reflector 340. Further, the second light emitting-receiving sensor 310 disposed on the upper right corner emits infrared radiation in parallel with the display surface 22 with respect to vertical surfaces. In this case, the emitting direction of the infrared radiation covers entire areas of the left reflector 320 and the lower reflector 340.

When nothing is in contact with the display surface 22, the infrared radiation emitted from the light emitting-receiving sensors 300 and 310 is entirely reflected off the reflectors 320, 330, and 340, which is then received by the light emitting-receiving sensors 300 and 310.

Note that when a pen tip 100A or a pen tail 100B of the pen-shaped input device 100 (detecting target) touches (is in contact with) the display surface 22, infrared radiation emitted from the light emitting-receiving sensors 300 and 310 is blocked off at a touched position (a contact position). Hence, a light emitting-receiving sensor circuit (an operational unit) 350 detects an inclination angle with respect to a horizontal direction of a part at which the infrared radiation is blocked off based on detected signals from the light emitting-receiving sensors 300 and 310, computes the coordinate position, and converts the computed coordinate position into X and Y coordinates by the triangulation method. The signals of the coordinate position acquired by the light emitting-receiving sensor circuit (an operational unit) 350 are transmitted to a later-described controller 60.

Figure 3:
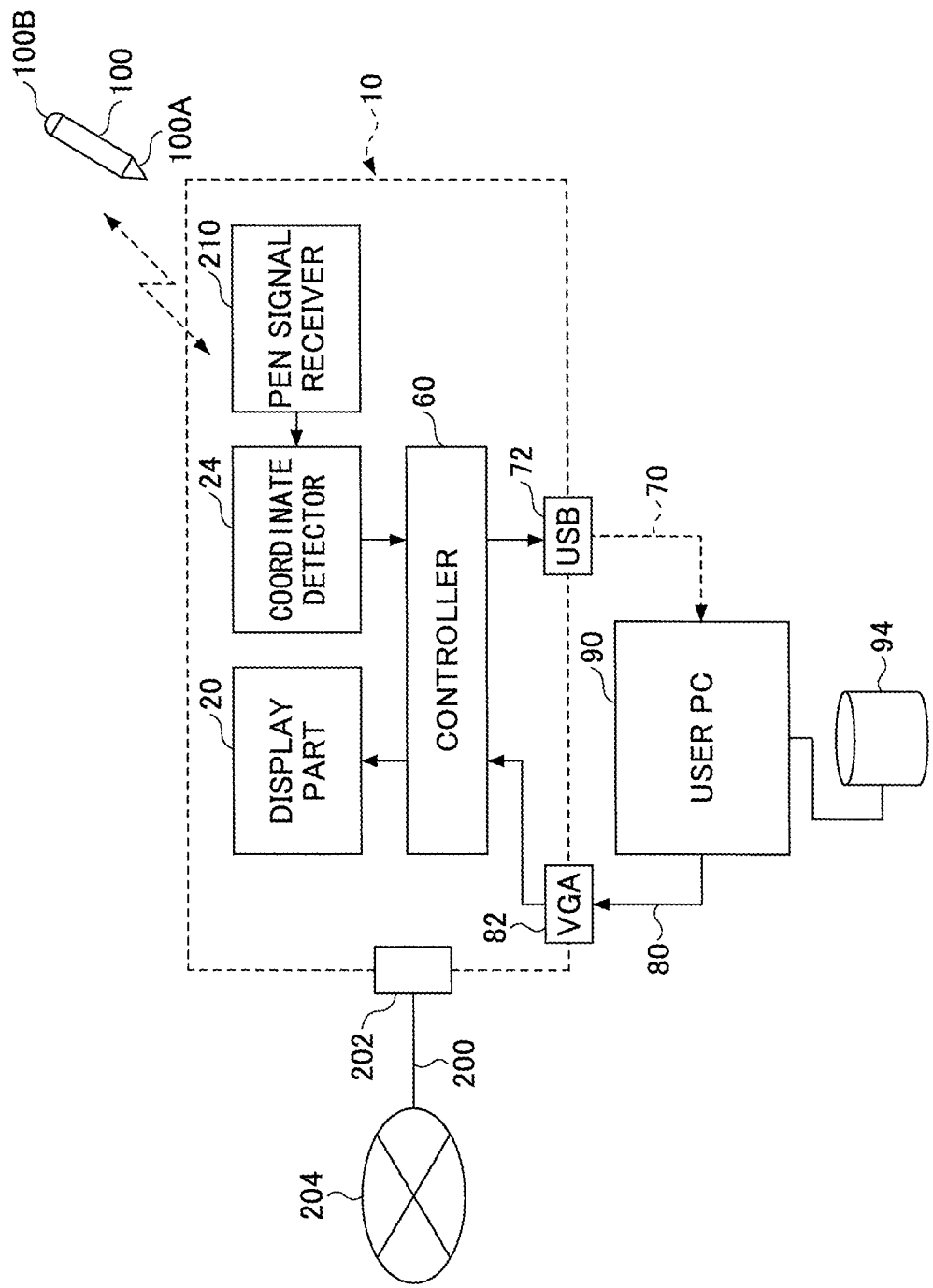
FIG. 3 is a schematic diagram illustrating a main part of the electronic information board system.

FIG. 3 is a diagram illustrating a control system of the electronic information board. As illustrated in FIG. 3, the display part 20 is controlled by the controller 60, and is configured to display an image acquired from a personal computer (PC) 90.

Further, the controller 60 includes a universal serial bus (USB) socket 72 connected to a universal serial bus (USB) cable 70, and a video graphics array (VGA) input socket 82 connected to a video graphics array (VGA) cable 80.

The user personal computer (PC) 90 is connected to the controller 60 via the USB socket 72 and the VGA input socket 82. Further, the user personal PC 90 includes a storage 94 composed of a magnetic disk device or the like. The storage 94 is configured to store programs such as various types of contents, display application software, and the like. Hence, an operator of the PC 90 may select a desired one of the contents stored in the storage 94 to display the selected content on a monitor of the user PC 90.

Accordingly, when image data displayed on the monitor of the user PC 90 are transferred via the USB cable 70 and the VGA cable 80, the controller 60 displays on the display surface 22 of the display part 20 an image that is the same as the image data displayed on the PC monitor.

The controller 60 is configured to include a network socket 202 to which a communication line 200 such as optical fiber is connected, such that the controller 60 is also connected to a network 204 such as the Internet or a local area network (LAN) via the network socket 202.

The electronic information board system 10 further includes a pen signal receiver 210 configured to receive detected signals transmitted from the pen-shaped input device 100. When receiving the detected signals transmitted from the pen-shaped input device 100, the pen signal receiver 210 inputs the detected signals into the coordinate detector 24. Hence, the coordinate detector 24 detects input operations performed by the pen-shaped input device 100 based on the detected signals from the pen-shaped input device 100, and outputs reporting signals reporting the reception of the detected signals to the controller 60.

Control System of Electronic Information Board System

Figure 4:
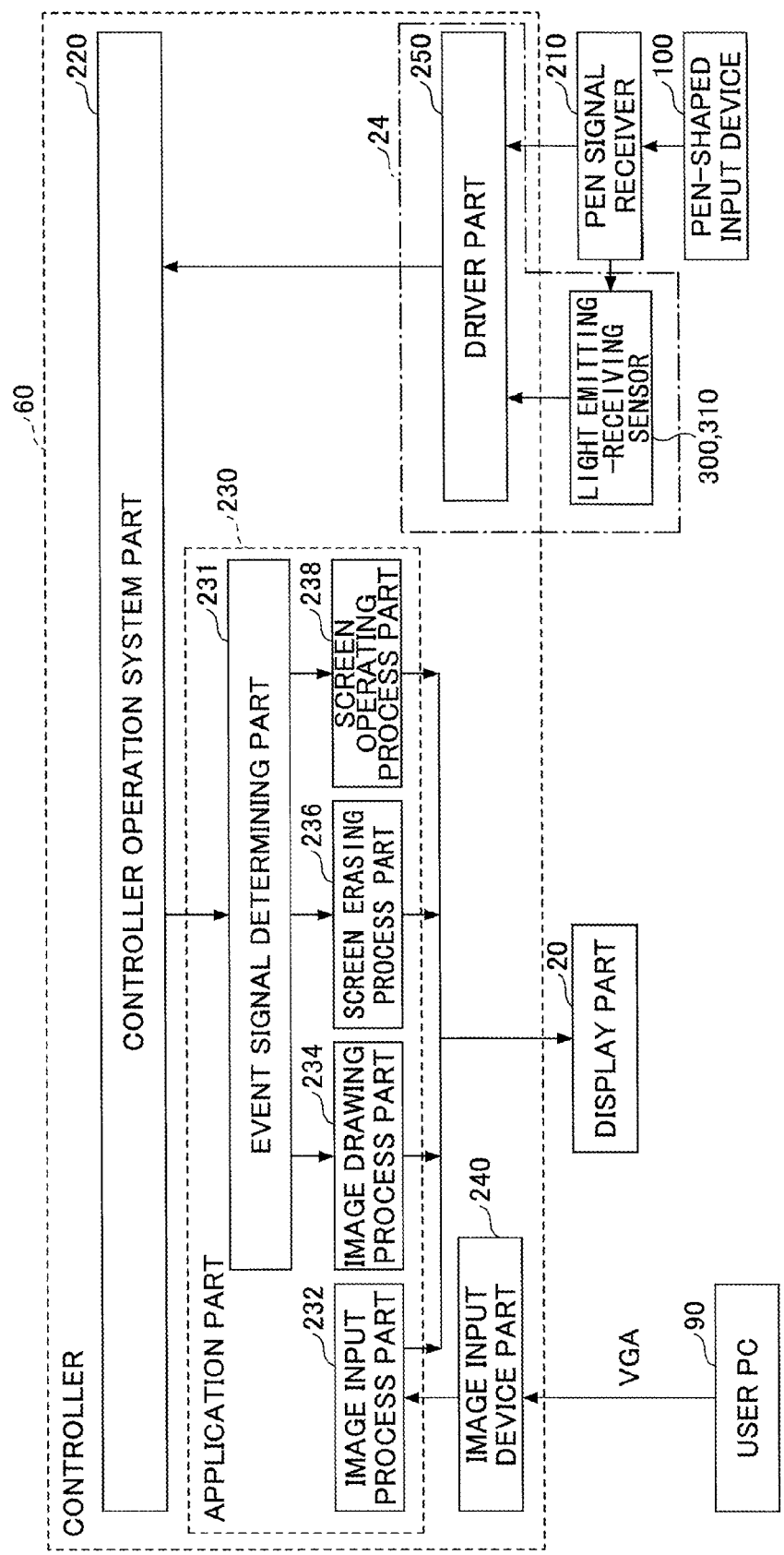
FIG. 4 is a block diagram illustrating a configuration of a controller of the electronic information board system.

FIG. 4 is a block diagram illustrating a configuration of the controller 60 of the electronic information board system. As illustrated in FIG. 4, the controller 60 of the electronic information board system 10 is configured to include the pen signal receiver 210, a controller operation system part 220, an application part 230, an image input device part 240, and a driver part 250 of the coordinate detector 24. Further, the application part 230 is configured to include an event signal determining part 231, an image input process part 232, an image drawing process part 234, a screen erasing process part 236, and a screen operating process part 238.

The controller operation system part 220 serves as a main controller configured to manage and execute control processes performed by the controller 60.

The application part 230 is configured to perform a control process to generate an overall image to be displayed on the display surface 22 of the display part 20, and a control process to display an image output from the user PC 90. Further, the application part 230 is configured to perform a control process to display characters or graphics written at the coordinate positions when detecting the written signals transmitted from the pen-shaped input device 100 that touches the display surface 22 of the display part 20.

The event signal determining part 231 is configured to monitor event signals input from the controller operation system part 220 so as to perform a control process based on the input event signals.

The image input process part 232 is configured to perform a control process for displaying an image input from the user PC 90 on the display surface 22.

The image drawing process part 234 is configured to generate hand-written graphics based on coordinate position data input from the coordinate detector 24 via the event signal determining part 231, and superpose the hand-written graphics onto the already displayed image to display the superposed graphics on the display surface of the display part 20.

The screen erasing process part 236 is configured to generate graphics with a background color of the currently displayed image based on the coordinate position data input from the coordinate detector 24 via the event signal determining part 231, and superpose the graphics of the background color onto the already displayed image to display the superposed graphics on the display surface 22 of the display part 20. Hence, the hand-written graphics appears to be erased from the display surface 22 by superposing the graphics of the background color onto the hand-written graphics displayed on the display part 20.

The screen operating process part 238 is configured to convert the coordinate position data (signals) input from the coordinate detector 24 via the event signal determining part 231 into pointing device signals such as mouse events to perform processes by ON or OFF operations of a screen operating part displayed on the display surface 22 of the display part 20. Further, the screen operating process part 238 is configured to transmit coordinate position data (information) at a position touched by the pen-shaped input device 100 as a mouse-down event together with coordinate values to the controller operation system part 220. Note that the position touched by the pen-shaped input device 100 is detected by the light emitting-receiving sensors 300 and 310 of the coordinate detector 24. Further, when the pen-shaped input device 100 is moved while being in contact with the display surface 22 of the coordinate detector 24, the screen operating process part 238 is configured to transmit coordinate position data (information) as a mouse-up event together with coordinate values to the controller operation system part 220.

The driver part 250 is configured to convert the coordinate position signals, and the writing detective signals or erasing detective signals input from the pen-shaped input device 100 and the coordinate detector 24 into predetermined event signals, and transmit the converted predetermined event signals to the controller operation system part 220. Further, when the pen signal receiver 210 receives the writing detective signals or the erasing detective signals from the pen-shaped input device 100, the driver part 250 transmits the received writing detective signals or erasing detective signals together with the coordinate position signals to the controller operation system part 220.

Configuration of Sensor Position Adjusting Mechanism

Figure 5:
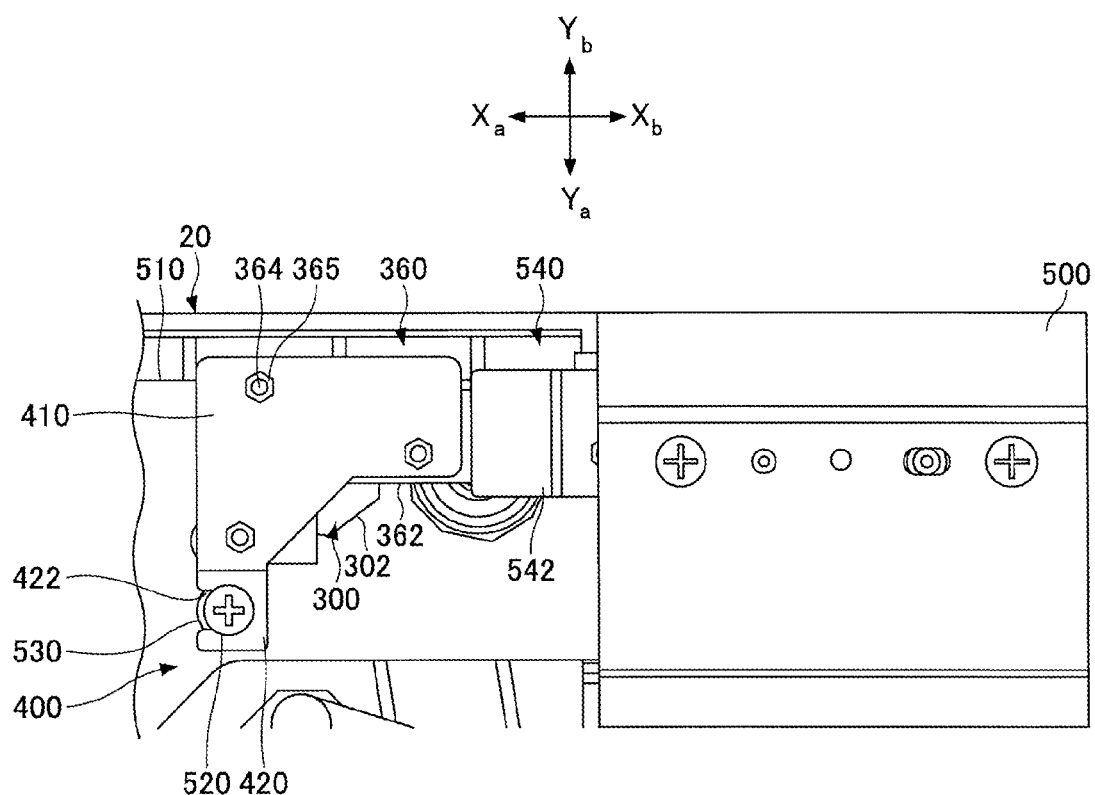
FIG. 5 is a diagram illustrating a sensor position adjusting mechanism disposed at a corner of a display part.
Figure 7:
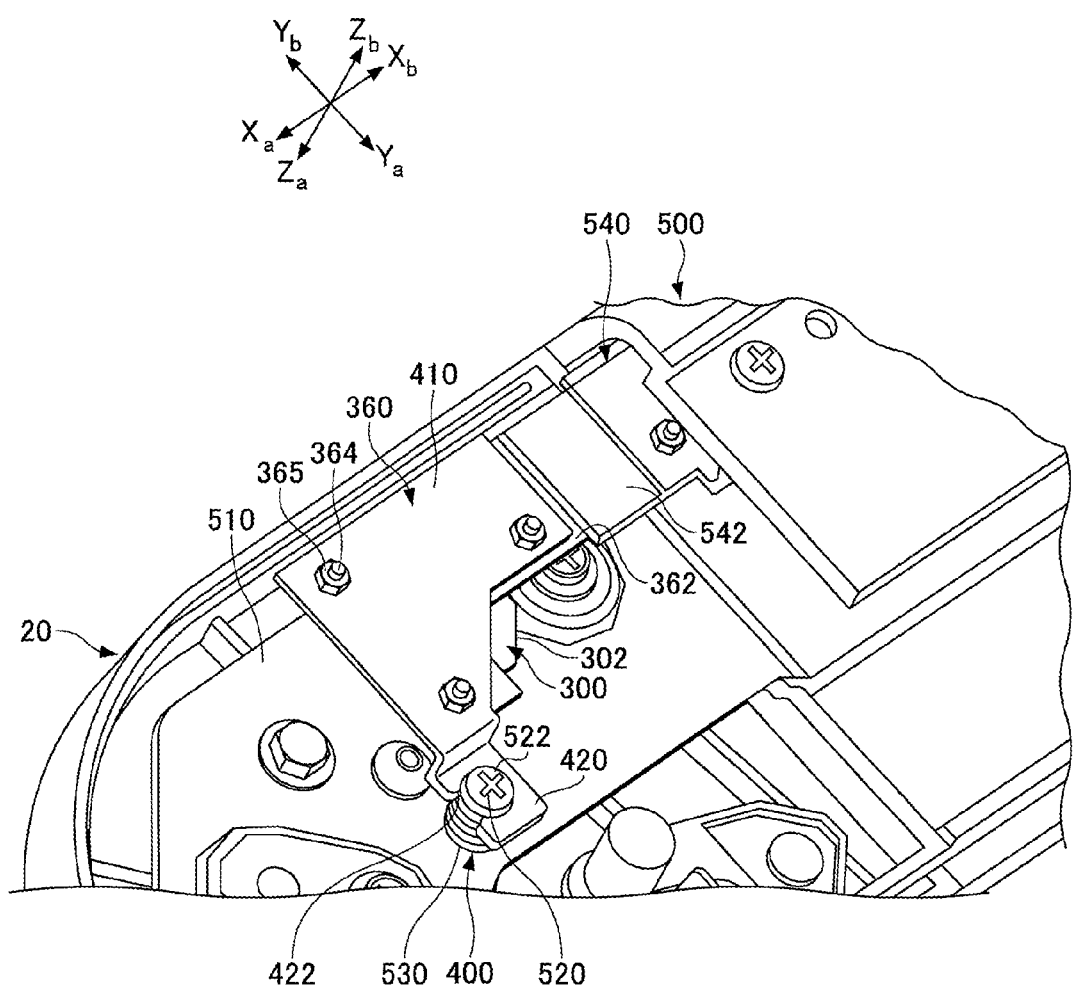
FIG. 7 is a perspective diagram illustrating the sensor position adjusting mechanism viewed from its rear side.

FIG. 5 is a diagram illustrating a sensor position adjusting mechanism disposed at a corner of the display part 20. FIG. 6 is a diagram illustrating the sensor position adjusting mechanism viewed from its bottom side. FIG. 7 is a perspective diagram illustrating the sensor position adjusting mechanism viewed from its rear side. The first and the second light sensor units 360 and 370 are symmetrically disposed at opposite corners of a rear surface of the display part. Hence, a description is given of a sensor position adjusting mechanism 400 of the first light sensor unit 360 as a representative.

As illustrated in FIGS. 5 to 7, the first light sensor unit 360 of the coordinate detector 24 is disposed at a left corner of the rear surface of the display part 20, and includes the sensor position adjusting mechanism 400 configured to adjust a roll angle θ and a light-receiving direction of infrared radiation of the light emitting-receiving sensor 300. Note that the sensor position adjusting mechanism 400 is disposed inside a housing 500 of the display part 20. In FIGS. 5 to 7, an external cover (see FIG. 12) that is supposed to be disposed at a corner of the housing 500 is not illustrated for clarifying the configuration, and hence, the sensor position adjusting mechanism 400 is illustrated in an exposed condition.

The first light sensor unit 360 is attached such that a light emitting-receiving surface 302 of the light emitting-receiving sensor 300, and an emitting direction of infrared radiation emitted from the light emitting-receiving surface 302 have predetermined angles with respect to the reflectors 330 and 340 in an assembly stage. The sensor position adjusting mechanism 400 serves as an adjusting unit for finely adjusting the rolling direction (i.e., the Za-Zb direction) of the light emitting-receiving surface 302 when the attached position of the light emitting-receiving sensor 300 is shifted due to vibration while being transported after the assembly.

The sensor position adjusting mechanism 400 includes a position adjusting bracket 410 fixed to a rear surface on a front end side (an end part in an Xa direction) of a printed circuit board 362 of the first light sensor unit 360. The sensor position adjusting mechanism 400 further includes a screw communicating part 420 projecting toward a front end side of the position adjusting bracket 410, and an adjusting screw member 520 inserted in the screw communicating part 420. The screw communicating part 420 of the position adjusting bracket 410 is bent in a crank shape in viewing from a lateral side, and is formed such that the position in a Z direction matches the center of the light emitting-receiving sensor in the Z direction (see FIG. 6). Further, the position adjusting bracket 410 is fastened with nuts 365 screwed in respective fixing screw members 364 attached in the rear surface of the printed circuit board 362 of the first light sensor unit 360. Hence, the position adjusting bracket 410 is integrally assembled with the printed circuit board 362.

Further, a rear anchor side (an end part in an Xb direction) of the printed circuit board 362 is fastened to a fixing bracket 540, such that the rear anchor side of the printed circuit board 362 is fixed to the frame 510 of the display part 20 via the fixing bracket 540. Hence, the rear anchor side (the end part in the Xb direction) of the printed circuit board 362 is fastened to the fixing bracket 540. Hence, the printed circuit board 362 is attached as a cantilever, such that the front end side (the end part in the Xa direction) of the printed circuit board 362 to which the position adjusting bracket 410 is fixed is displaceable in a front-rear direction (i.e., the Za-Zb direction).

Further, the fixing bracket 540 includes a undercut part such that the front end side (the end part in the Xa direction) forms a narrow gap with the printed circuit board 362. The printed circuit board 362 includes an elastic deformation area S (see FIG. 6) between the position adjusting bracket 410 and the undercut part of the fixing bracket 540. Note that the elastic deformation area S is not constrained by the metallic position adjusting bracket 410 or the fixing bracket 540. The elastic deformation area S serves as a hinge for adjusting the sensor position since the elastic deformation area S is warped in the Za-Zb direction by turning operations of the adjusting screw member 520.

The adjusting screw member 520 is threaded in a horizontal direction (Za direction) orthogonal to the frame 510 that is extendedly formed in a vertical direction. Further, the adjusting screw member 520 has a head part 522 and a screw part 524. The head part 522 is located on a rear surface side of the display part 20, and the screw part 524 is to be screwed into a screw hole 512 of the frame 510 located at a front side (Za direction) of the screw communicating part 420. When the head part 522 of the adjusting screw member 520 is turned in a fastening direction (a clockwise direction) with a tool such as a screwdriver, the screw communicating part 420 of the position adjusting bracket 410 is displaced toward the front side (Za direction). Hence, the screw communicating part 420 of the position adjusting bracket 410 is adjusted in a direction in which a gap (see FIG. 12) between the frame 510 and the screw communicating part 420 becomes smaller.

Further, a coil spring (elastic member) 530 is disposed in the gap between the frame 510 and the screw communicating part 420. The coil spring 530 presses the screw communicating part 420 in a direction in which the screw communicating part 420 moves away from the frame 510. Hence, when the head part 522 of the adjusting screw member 520 is turned in an unfastening direction (a counterclockwise direction) by a tool such as a screwdriver, pressing force applied to the screw communicating part 420 in a direction toward the frame 510 is relaxed. Thus, the screw communicating part 420 is displaced in a direction toward a rear side (Zb direction) due to the pressing force (spring force) of the coil spring 530, and the screw communicating part 420 is adjusted in a direction in which the gap (see FIG. 12) between the screw communicating part 420 and the frame 510 becomes larger.

As described above, the screw communicating part 420 of the position adjusting bracket 410 is displaced in the Za-Zb direction by turning the head part 522 of the adjusting screw member 520, and the front end of the first light sensor unit 360 to which the position adjusting bracket 410 is fixed is also displaced in the Za-Zb direction. At this time, the light emitting-receiving sensor 300 of the first light sensor unit 360 has the light emitting-receiving surface 302 serving as a light emitting surface and a light receiving surface that faces obliquely downward at an angle of inclination of 45 degrees. Further, the screw communicating part 420 and adjusting screw member 520 are disposed obliquely downward to the left of the light emitting-receiving sensor 300, and a right side end of the position adjusting bracket 410 is disposed obliquely upward to the right of the light emitting-receiving sensor 300. Hence, as illustrated in FIG. 6, when the screw communicating part 420 of the position adjusting bracket 410 is displaced in the Za-Zb direction, the direction of the light emitting-receiving surface 302 of the light emitting-receiving sensor 300 of the first light sensor unit 360, namely, a roll angle θ of infrared radiation is adjusted.

Note that an adjusting direction of the roll angle θ is a width direction (i.e., the Za-Zb direction) orthogonal to extending directions of the reflectors 320, 330, and 340 (see FIG. 2) of the above-described coordinate detector 24. Accordingly, infrared radiation emitted from the light emitting-receiving sensor 300 may be applied to inner sides (Za direction) of the reflectors 320, 330, and 340, or infrared radiation emitted from the light emitting-receiving sensor 300 may be applied to outer sides (Zb direction) that are deviated from the reflectors 320, 330, and 340, based on the roll angle θ of infrared radiation.

Configuration of First Light Sensor Unit 360

Figure 8A:
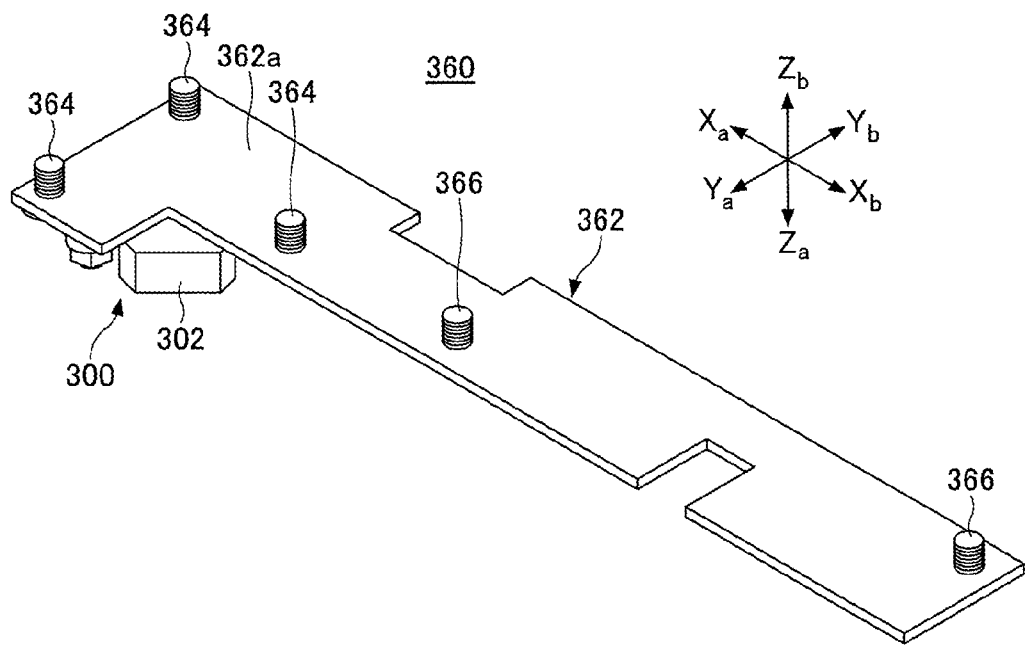
FIGS. 8A and 8B are perspective diagrams illustrating configurations of a light sensor unit.
Figure 8B:
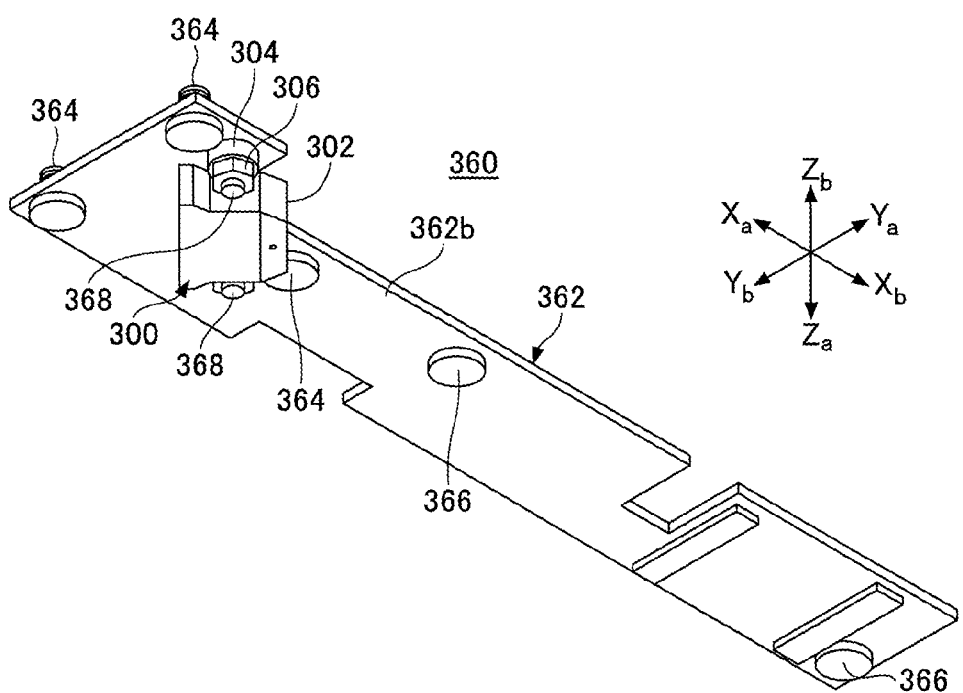

FIGS. 8A and 8B are perspective diagrams each illustrating a configuration of the first light sensor unit 360. As illustrated in FIGS. 8A and 8B, the first light sensor unit 360 includes the printed circuit board 362, and the light emitting-receiving sensor 300 disposed on a lower surface 362b on the front end side of the printed circuit board 362. The printed circuit board 362 further includes various electronic components to generate control signals for forming various wiring patterns on the surface of the printed circuit board 362, emitting infrared radiation with respect to the light emitting-receiving sensor 300, and to process detected signals when receiving the reflected light.

Further, the printed circuit board 362 may be formed of an insulating material such as epoxy resin. Hence, when the head part 522 of the adjusting screw member 520 is turned with the tool to apply pressing force in the Za-Zb direction to the printed circuit board 362, the elastic deformation area S that is not constrained by the position adjusting bracket 410 and the fixing bracket 540 is elastically displaced.

An upper surface 362a of the printed circuit board 362 includes three bracket bolts 364 disposed upright on its front end side, and two bracket bolts 366 disposed upright on its rear anchor side. In addition, a lower surface 362b of the printed circuit board 362 includes two sensor bolts disposed upright.

Further, the light emitting-receiving sensor 300 is fastened via fixing parts 304 disposed on opposite sides of the light emitting-receiving sensor 300 by fastening nuts 306 screwed in sensor bolts 368 of the printed circuit board 362, and in addition, the nuts 306 are adhered to the fixing parts 304 with adhesive so that the nuts 306 will not be unfastened. That is, the light emitting-receiving sensor 300 is integrally disposed with the printed circuit board 362, and the light emitting-receiving sensor 300 is also located such that a rolling direction of infrared radiation with respect to the printed circuit board 362 is in a predetermined direction.

Figure 9A:
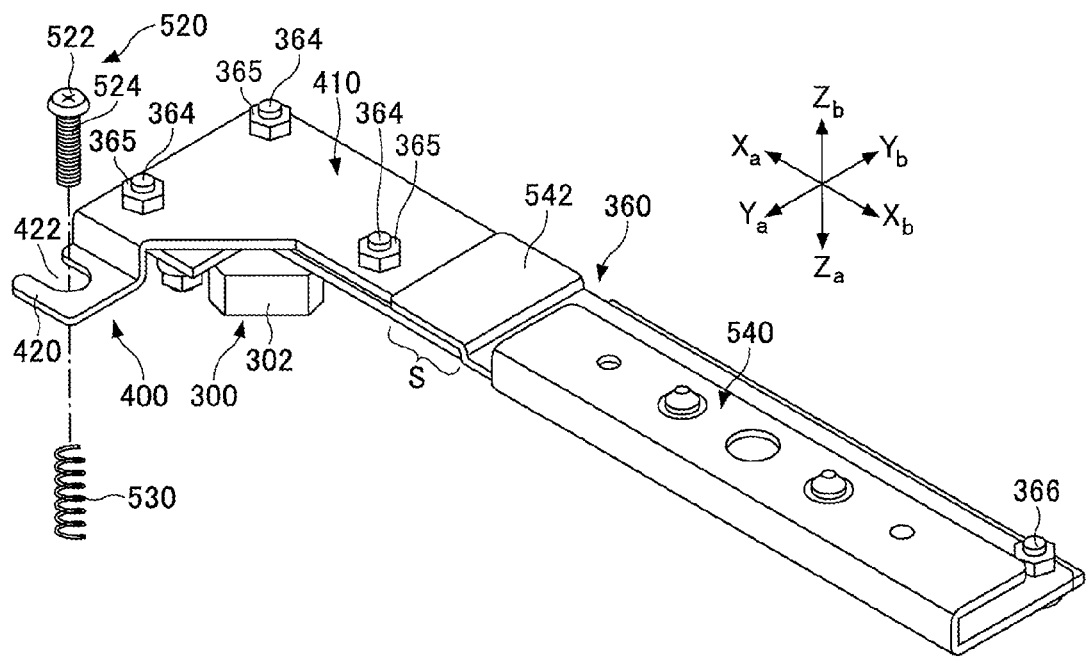
FIGS. 9A and 9B are perspective diagrams illustrating configurations of a supporting structure of the light sensor unit.
Figure 9B:
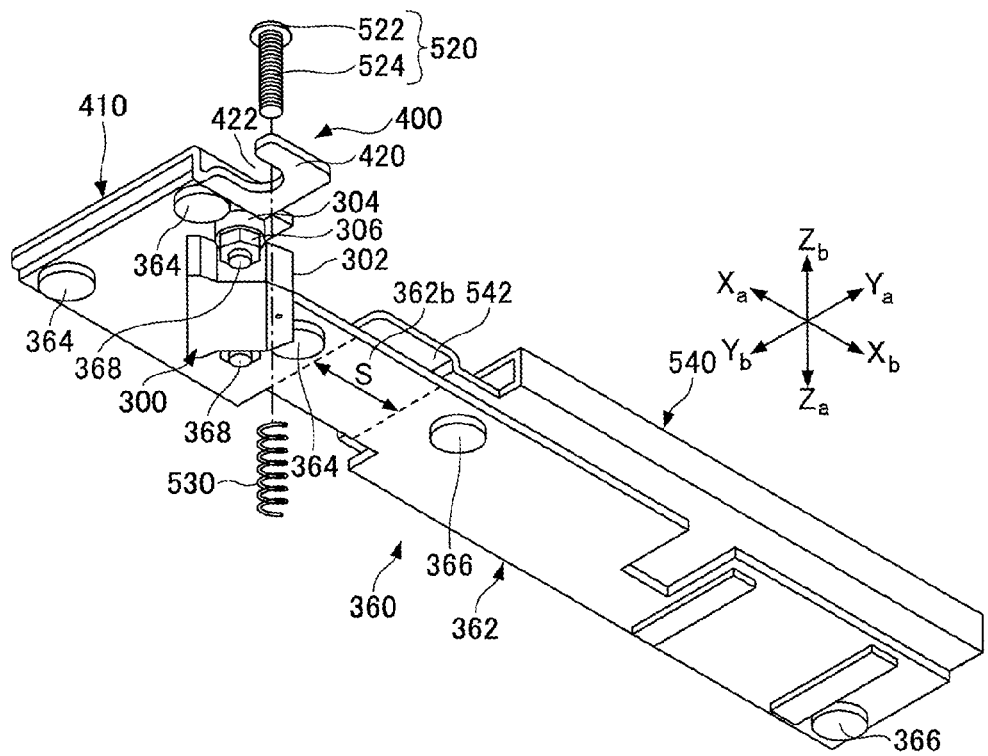

FIGS. 9A and 9B are perspective diagrams each illustrating a supporting structure of the first light sensor unit 360. As illustrated in FIGS. 9A and 9B, in the first light sensor unit 360, the nuts 365 to fasten the position adjusting bracket 410 are screwed in the bracket bolts 364 on the front end side of an upper surface 632a of the printed circuit board 362. Hence, the position adjusting bracket 410 is fixed in a state in which the entire lower surface of the position adjusting bracket 410 is in contact with the upper surface of the printed circuit board 362, which enables the position adjusting bracket 410 to serve as a supporting member to reinforce the front end part of the printed circuit board 362.

The screw communicating part 420 projected toward a lateral side (Ya direction) from the front end of the position adjusting bracket 410 includes a U-shaped cutout 422 via which the adjusting screw member 520 is communicated with. The adjusting screw member 520 has the head part 522 having a diameter larger than that of the U-shaped cutout so that the head part 522 is in contact with the screw communicating part 420. The adjusting screw member 520 also has the screw part 524 having a diameter smaller than that of the U-shaped cutout so that the screw part 524 passes through the U-shaped cutout to be screwed in the screw hole 512 of the frame 510. The coil spring 530 is in contact with a lower side of the screw communicating part 420.

Hence, when the head part 522 of the adjusting screw member 520 is turned in an axial rotational direction, the screw communicating part 420 is displaced in the Za-Zb direction to adjust the direction of the light emitting-receiving surface 302 of the light emitting-receiving sensor 300.

Further, the elastic deformation area S elastically deforming at the sensor position adjusting time is located at a position between the metallic position adjusting bracket 410 fastened to the printed circuit board 362 and the fixing bracket 540. As a result, the elastic deformation area S is disposed away from the adjusting position of the adjusting screw member 520. Hence, the elastic deformation area S is configured such that the elastic deformation area S exhibits moderate deformation at the position adjusting time to reduce imposing load to be relatively small. Further, the elastic deformation area S faces an undercut part 542 of the fixing bracket 540 so that the elastic deformation area S is unseen from the rear side of the light sensor unit 360.

Principle of Sensor Position Adjusting Method

Figure 10:
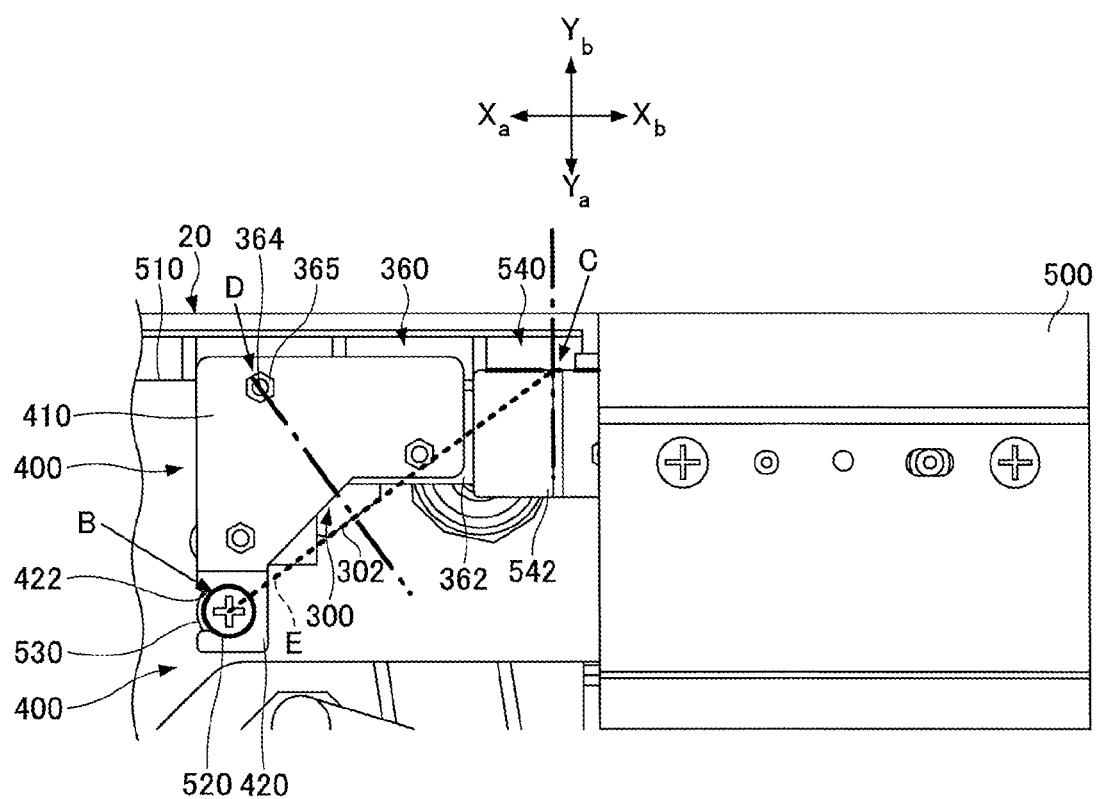
FIG. 10 is a diagram illustrating the sensor position adjusting mechanism viewed from its rear side.

FIG. 10 is a diagram illustrating the sensor position adjusting mechanism 400 viewed from its rear side. As illustrated in FIG. 10, the light emitting-receiving surface 302 of the light emitting-receiving sensor 300 is orthogonal to a central line D of the light emitting-receiving sensor 300. In addition, the light emitting-receiving surface 302 of the light emitting-receiving sensor 300 is attached along a straight line E connecting an adjusting position B of the adjusting screw member 520 adjusting the sensor position and a fulcrum C assumed in the elastic deformation area S of the light sensor unit 360. Note that the fulcrum C of the light sensor unit 360 is situated at the elastic deformation area S of the aforementioned printed circuit board 362. Further, in this configuration, the adjusting screw member 520 is situated at a position outside the distance between the fulcrum C assumed in the elastic deformation area S of the light sensor unit 360 and the central line D of the light emitting-receiving sensor 300. Hence, the displaced amount of the light emitting-receiving sensor 300 is smaller than the displaced amount with respect to the turning angle of the adjusting screw member 520, which may facilitate the fine adjustment of the roll angle $\theta$ of the light emitting-receiving sensor 300.

When the head part 522 of the adjusting screw member 520 is turned in an axial rotational direction, the screw communicating part 420 serving as the adjusting position B is displaced in the Za-Zb direction while the position adjusting bracket 410 is inclined based on the fulcrum C as a center. Accordingly, the light emitting-receiving surface 302 of the light emitting-receiving sensor 300 situated in the straight line E connecting the adjusting position B and the fulcrum C is displaced in the Za-Zb direction based on the fulcrum C as a center. Then, when the light emitting-receiving surface 302 located in the straight line E is displaced in the Za-Zb direction, the light emitting-receiving sensor 300 is displaced in the Za-Zb direction orthogonal to the central line of the light emitting-receiving sensor 300. Hence, in the light emitting-receiving sensor 300, the direction of the light emitting-receiving surface 302 is changed based on the central line D as a fulcrum such that the roll angle $\theta$ (see FIG. 6) is adjusted.

The following conditions may be critical to adjusting the position of the light emitting-receiving sensor 300.

Condition 1: The direction of the light emitting-receiving surface 302 (the roll angle $\theta$) is adjusted such that the light emitting-receiving sensor 300 may be able to emit and receive infrared radiation with respect to an entre coordinate detecting area (range) of the coordinate detector 24. In this case, the light emitting-receiving sensor 300 is configured such that infrared radiation from the light emitting-receiving sensor 300 may be applied to an area inside outlines of the reflectors 330 and 340. Note that in a case of the light emitting-receiving sensor 310, the light emitting-receiving sensor 310 is configured such that infrared radiation from the light emitting-receiving sensor 310 may be applied to an area inside outlines of the reflectors 320 and 340.

Condition 2: The application area (range) of infrared radiation may be deviated outwardly when the light emitting-receiving surface 302 is displaced in the Za-Zb 1E direction. Hence, it is preferable to finely adjust the direction of the roll angle θ of the light emitting-receiving surface 302.

Condition 3: Further conditions for the adjusting method when finely adjusting the direction of the roll angle θ of the light emitting-receiving surface 302.

3-1: It is preferable that the center in the Z direction of the light emitting-receiving sensor 300 match the position in the Z direction of the screw communicating part 420 of the position adjusting bracket 410.

3-2: In FIG. 10, it is preferable that the straight line E connecting the adjusting position B of the adjusting screw member 520 adjusting the sensor position serving as the power point and the fulcrum C assumed in the elastic deformation area S of the light sensor unit 360 be orthogonal to the central line D of the light emitting-receiving sensor 300.

3-3: It is preferable that the distance between the fulcrum C assumed in the elastic deformation area S of the light sensor unit 360 and the center in the Z direction of the light emitting-receiving sensor 300 be small.

Figure 11:
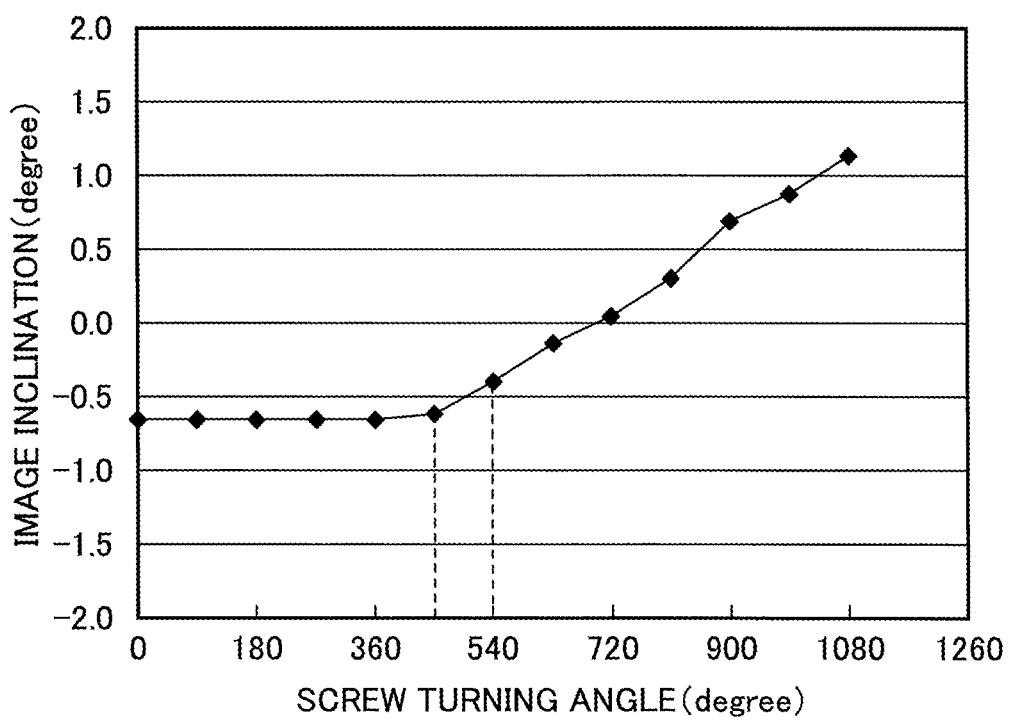
FIG. 11 is a graph illustrating a relationship between an adjusting screw turning angle of the sensor position adjusting mechanism and the inclination of a detected image.

FIG. 11 is a graph illustrating a relationship between an adjusting screw turning angle of the sensor position adjusting mechanism 400 and the inclination of a detected image. As illustrated in FIG. 11, the graph indicates the inclination of the light emitting-receiving sensor 300 when the turning angle of the adjusting screw member 520 is changed by every 90 degrees. Note that in FIG. 11, the inclination of the light emitting-receiving sensor 300 remains unchanged in a turning angle range of 360 to 540 degrees of the adjusting screw member 520. This is because the head part 522 of the adjusting screw member 520 is yet to be in contact with the screw communicating part 420 of the position adjusting bracket 410.

Further, the graph illustrates that the inclination of the light emitting-receiving sensor 300 starts changing by 0.25 degrees after the turning angle of the adjusting screw member 520 reaches 540 degrees at which the head part 522 of the adjusting screw member 520 starts touching the screw communicating part 420 of the position adjusting bracket 410. Note that the graph illustrated in FIG. 11 is an example in which the inclination of the light emitting-receiving sensor 300 with respect to the turning angle of the adjusting screw member 520 may be adjusted at a desirable value by changing the lead angle of the adjusting screw member 520.

In addition, the resolution of the inclination of the light emitting-receiving sensor 300 may further be increased by reducing the turning angle of the adjusting screw member 520 to 90 degrees or less.

Figure 12:
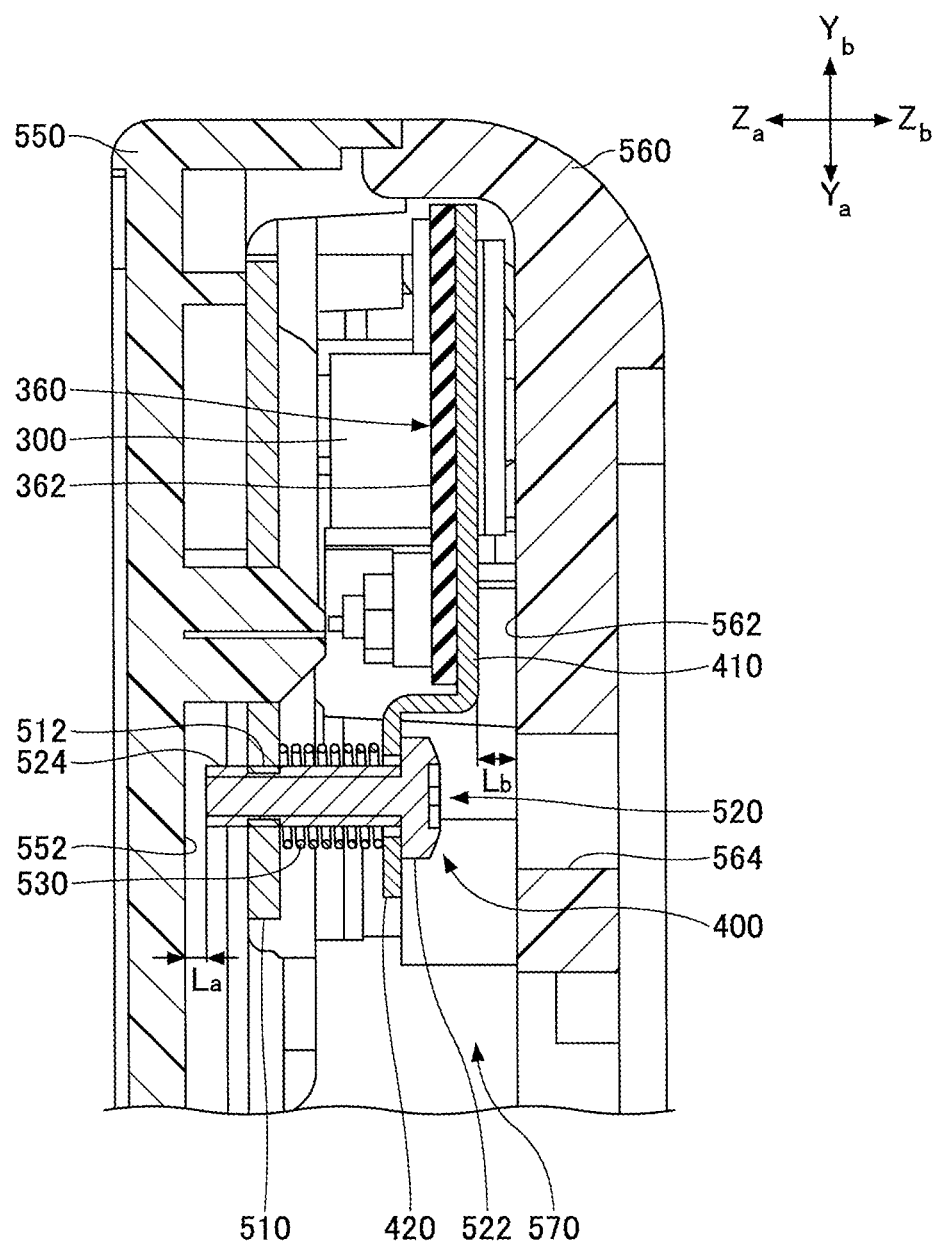
FIG. 12 is a cross-sectional diagram illustrating the sensor position adjusting mechanism viewed from its lateral side.

FIG. 12 is a diagram illustrating the sensor position adjusting mechanism 400 viewed from its lateral side. As illustrated in FIG. 12, the sensor position adjusting mechanism 400 is stored in a space 570 formed between a front-side housing 550 forming a housing of the display part 20 and an exterior cover member 560 of a rear-side housing. The adjusting range in the Z direction adjusted by the adjusting screw member 520 is restricted by an inner wall 552 of the front-side housing 550 forming the space 570 and an inner wall 562 of the exterior cover member 560. That is, the inner wall 552 of the front-side housing 550 and the inner wall 562 of the exterior cover member 560 serve as a stopper to restrict the adjusting range of the sensor position adjusting mechanism 400.

The adjusting screw member 520 has the screw part 524 screwed in the screw hole 512 of the frame 510, and a gap La formed between an end part of the screw part 524 penetrating the frame 510 and the inner wall 552 of the front-side housing 550 corresponds to the adjusting range in the Za direction.

Further, the adjusting screw member 520 has the head part 522 that is in contact with the screw communicating part 420, and a gap Lb between the rear surface of the position adjusting bracket 410 and the inner wall 562 of the exterior cover member 560 corresponds to the adjusting range in the Zb direction.

Hence, the adjusting range obtained by turning the adjusting screw member 520 with the tool may be restricted by the above-described gaps La and Lb. The gaps La and Lb are set based on an elastically deformable amount of the elastic deformation area S of the light sensor unit 360. Hence, even though the sensor adjusting operation is performed such that the turning angle of the adjusting screw member 520 reaches the maximum degrees, the printed circuit board 362 will not have any adverse effects.

Further, the exterior cover member 560 has a tool inserting hole 564 at a position facing the head part 522 of the adjusting screw member 520. Hence, when adjusting the sensor position adjusting operations, the tool may be inserted from the outside (i.e., the rear side) into the tool inserting hole 564 without removing the exterior cover member 560 to turn the head part 522 of the adjusting screw member 520 in a clockwise direction or a counterclockwise direction.

In the following, a description will be given of the sensor position adjusting method performed by turning the adjusting screw member 520. When performing the sensor adjusting operations, sensor position adjusting software installed in the controller 60 or the personal computer connected to the controller 60 is activated. The controller 60 may monitor detected signals of the light emitting-receiving sensor 300 that are output when the light emitting-receiving sensor 300 receives reflected light from the reflectors 330 and 340 by utilizing the sensor position adjusting software. Further, the controller 60 includes a determination unit configured to determine whether a radiation pattern image acquired from the detected signals falls within a specific control window.

Figure 13:
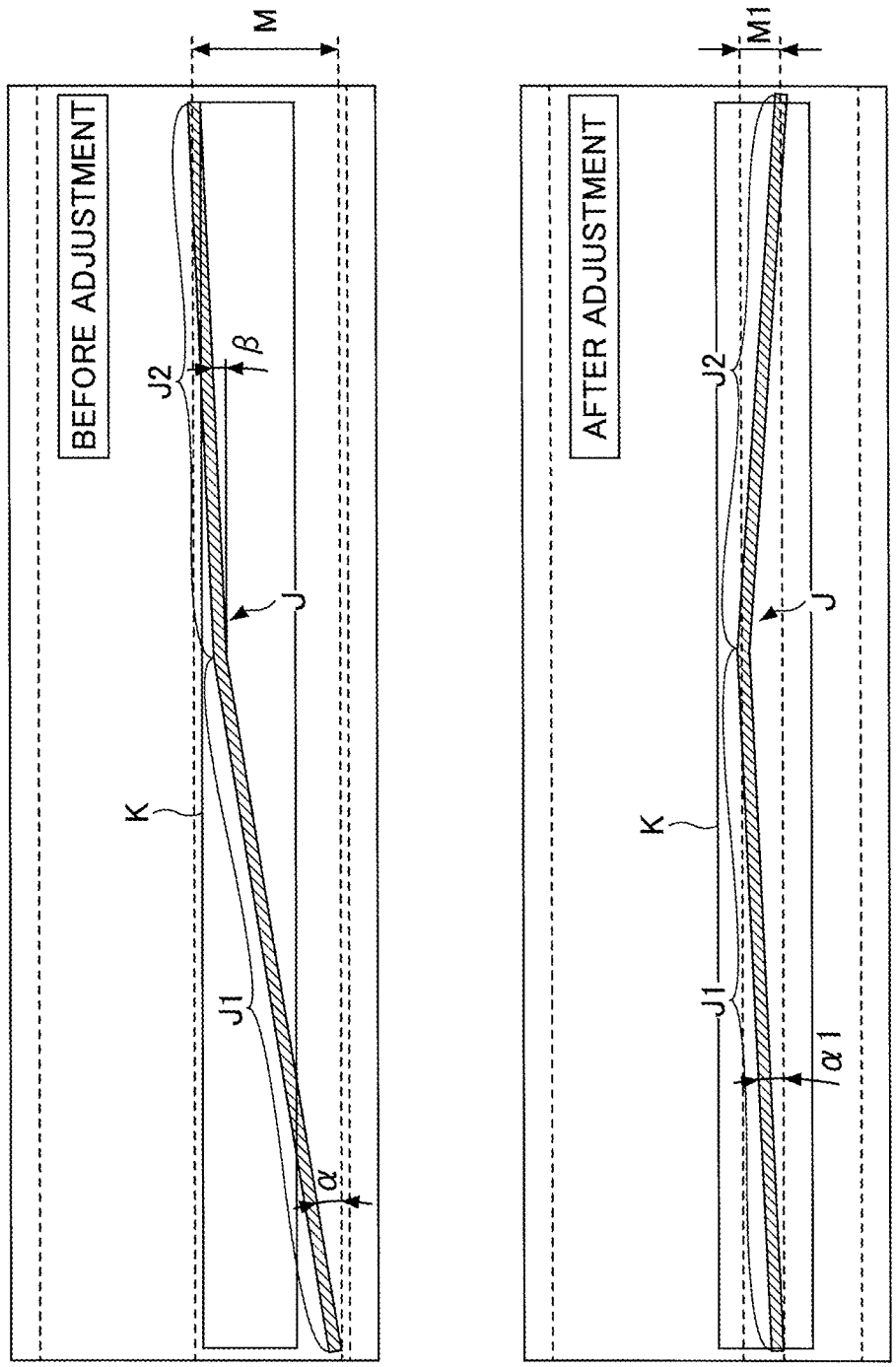
FIGS. 13A and 13B are diagrams illustrating relative positions of a control window and a radiation pattern detected before and after the sensor position is adjusted.

FIGS. 13A and 13B are diagrams illustrating relative positions of a control window and a radiation pattern image detected before and after the sensor position is adjusted. As illustrated in FIG. 13A, an image of a radiation pattern J acquired from detected signals is a combination of a radiation pattern J1 of the reflector 330 and a radiation pattern J2 of the reflector 340. Further, the radiation J has the inclination viewed from the light emitting-receiving sensor 300. Hence, the an inclination α of the radiation pattern J1 differs from an inclination β of the radiation pattern J2. In this case, a width M in a vertical axis direction of the radiation pattern J1 is greater than a width of the control window K.

Hence, the controller 60 (the sensor position adjusting software) detects that a left end part of the radiation pattern J1 is projected with respect to the horizontally elongated rectangular control window K, and determines the detected result as an error. The control window K is a virtual scale representing detectable area of the reflector 340 formed by software. In this case, an infrared radiation position around a lower left corner of the coordinate detector 24 being deviated from the control window K is detected based on the radiation pattern J1 of the light emitting-receiving sensor 300.

Hence, the roll angle θ (see FIG. 6) of the light emitting-receiving sensor 300 is finely adjusted by turning the adjusting screw member 520 of the sensor position adjusting mechanism 400 in an axial rotational direction. As the finely adjusting method, the roll angle θ of infrared radiation emitted from the light emitting-receiving sensor 300 is finely adjusted by displacing the screw communicating part 420 of the position adjusting bracket 410 fastened to the printed circuit board 362 in the Za-Zb direction.

As illustrated in FIG. 13B, the inclination α of the radiation pattern J1 with respect to a horizontal axis is reduced to α1 (α>α1), so that the width M1 (M>M1) in the vertical axis direction may be reduced by a corresponding reduced amount from a. As a result, the radiation pattern J1 resides inside the control window K. Note that when turning the adjusting screw member 520 in a reverse direction, the inclinations α and β of the radiation pattern J1 with respect to the horizontal axis increase. As a result, the radiation pattern J1 is projected significantly from the control window K. Accordingly, an operator may need to finely adjust the turning direction and the turning angle of the adjusting screw member 520 while monitoring (checking) the change in the inclination of the radiation pattern J1 displayed on the monitor of the personal computer or the display part.

The controller 60 installs a control program (the determination unit), which, when processed by a processor, causes controller 60 to perform the following procedure. That is, when the position of the radiation pattern J1 moves in the vertical axis direction, the controller 60 moves the control window K in the vertical axis direction to determine whether an entire image of the radiation pattern J1 falls inside the control window K. Note that the control to move the control window K in the vertical axis direction based on the position of the radiation pattern J1 is automatically performed by the control program (i.e., the determination unit).

Second Embodiment

Figure 14:
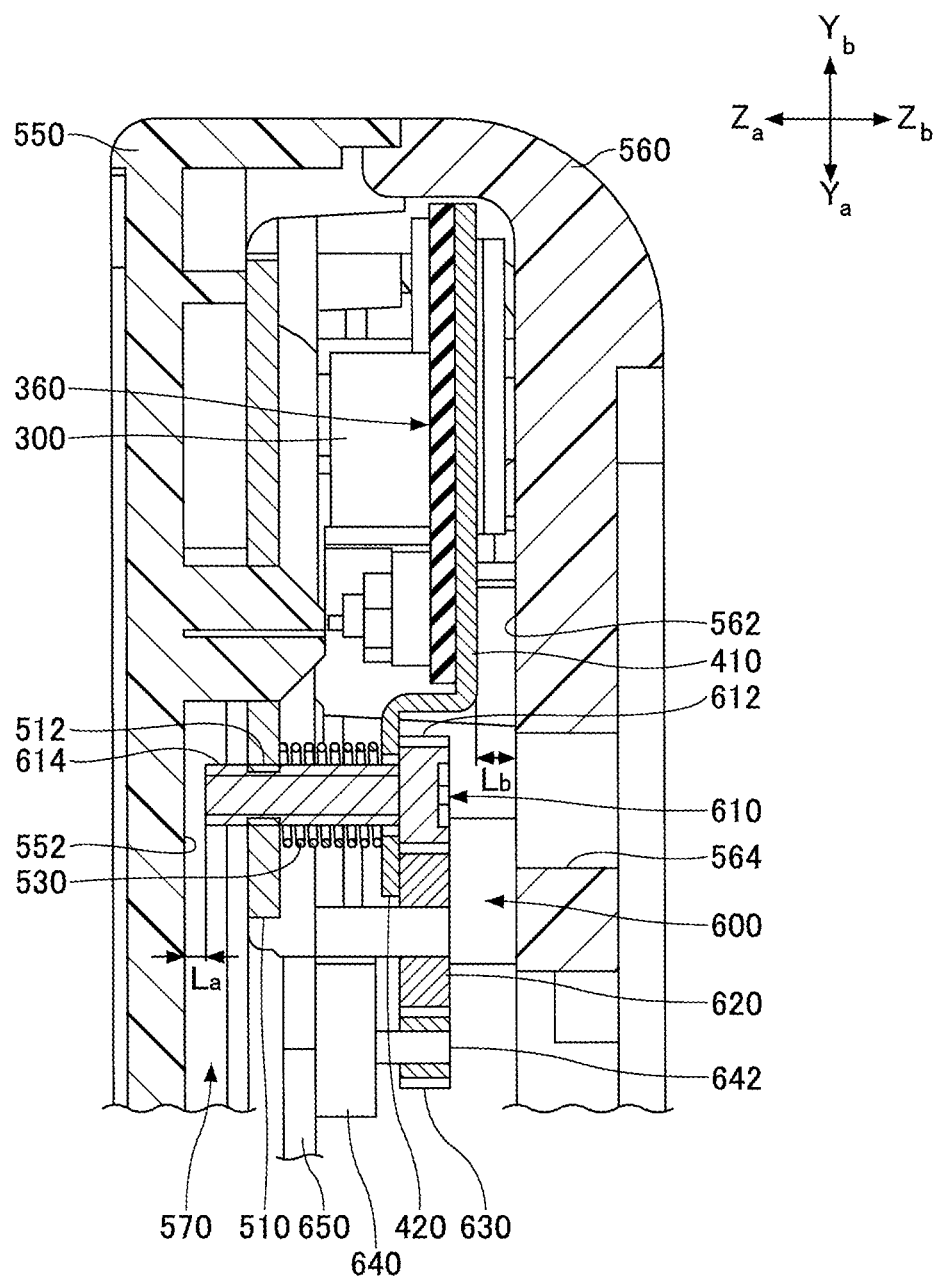
FIG. 14 is a cross-sectional diagram illustrating a sensor position adjusting mechanism viewed from its lateral side in a second embodiment.

FIG. 14 is a cross-sectional diagram illustrating a sensor position adjusting mechanism viewed from its lateral side in a second embodiment. As illustrated in FIG. 14, a sensor position adjusting mechanism (sensor position adjusting unit) 600 includes an adjusting screw member 610, a decelerating gear 620, a drive gear 630, and a compact motor 640. The compact motor 640 is fastened to a bracket 650 fixed to the frame 510. Further, the compact motor 640 may be formed of a stepping motor configured to drive the rotational angle of the drive gear 630 connected to a motor shaft 642 by every predetermined angle based on the input number of drive pulses.

An adjusting screw member 610 includes a driving gear 612 formed on an outer circumference of the head part of the adjusting screw member 610, and a screw part 614 screwed in a screw hole 512 of the frame 510. The driving gear 612 is engaged with the decelerating gear 620, such that the rotation of the drive gear 630 is transmitted via the decelerating gear 620. Accordingly, the compact motor 640 turns the adjusting screw member 610 in an axial rotational direction via the drive gear 630, the decelerating gear 620, and the driving gear 612.

Note that the turning angle of the screw part 614 with respect to the rotational angle of the drive gear 630 may be appropriately set based on a gear ratio of the drive gear 630, the decelerating gear 620, and the driving gear 612. Hence, the adjusting screw member 610 may be turned by every 0.25 degrees using the drive force of the compact motor 640.

The controller 60 determines whether the image of the radiation pattern J falls inside the control window K while monitoring relative positions of the image of the radiation pattern J and the control window K, as illustrated in FIGS. 13A and 13B. The controller 60 includes a control unit configured to control the rotational angle of the compact motor 640 based on the determination result. Hence, the rolling direction (i.e., the roll angle θ) of infrared radiation from the light emitting-receiving sensor 300 is automatically adjusted by turning the adjusting screw member 610 in an axial rotational direction, and displacing the screw communicating part 420 of the position adjusting bracket 410 fastened to the printed circuit board 362 in the Za-Zb direction.

Note that the automatic adjustment process of the sensor position may be performed when the power switch is ON, or may be performed at every predetermined time. Hence, it may be possible to maintain the roll angle θ of infrared radiation at an optimal value by automatically adjusting the position of the light emitting-receiving sensor 300 after the electronic information board system 10 is placed on the user side. For example, even when the position of the light emitting-receiving sensor 300 is slightly changed due to the vibration while transporting, or the effect of thermal expansion with a temperature change, it may be possible to automatically adjust the sensor position by the automatically adjusting process to cause the entire image of the radiation pattern J1 falls inside the control window K.

Note that according to the above-described embodiments, illustration is given of the examples of the electronic information board system 10 detecting coordinates of the pen-shaped input device when the pen-shaped input device touches (i.e., is in contact with) the display surface of the electronic information board system 10. However, the embodiments of the present invention are not limited to those examples. The embodiments of the present invention may also be applied a display apparatus or a terminal apparatus that includes a coordinate detector with a system without utilizing the pen-shaped input device.

The embodiments include the sensor position adjusting unit configured to adjust the rolling direction of the light sensor unit with respect to the optical reflective members. Accordingly, when the position of the light sensor unit is shifted during transportation, it may be possible to adjust the radiation emitted from the light sensor unit such that the emitted radiation is appropriately applied to the optical reflective members.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

The present application is based on and claims the benefit of priority of Japanese Priority Application No. 2012-267889 filed on Dec. 7, 2012, and Japanese Priority Application No. 2013-223181 filed on Oct. 28, 2013, the entire contents of which are hereby incorporated by reference.

What is claimed is:

1. A coordinate detector comprising:
a pair of light sensor units disposed on a side of a display part having a display surface to be touched by a target to be detected and having a frame;
optical reflective members respectively disposed on remaining three sides of the display part; and
a sensor position adjusting unit configured to adjust a rolling direction of each of the light sensor units with respect to the optical reflective members, wherein
when the target touches the display surface, coordinates of the target are detected based on light reflected off the optical reflective members that is received by the light sensor units, and wherein the sensor position adjusting unit includes an adjusting screw member configured to adjust a distance between a front end of each of the light sensor units and the frame of the display part, and an elastic member configured to press the adjusting screw member.

2. The coordinate detector as claimed in claim 1, wherein a rear end of each of the light sensor units is fastened to the frame of the display part, wherein
the rolling direction of each of the light sensor units with respect to the optical reflective members is adjusted based on a screw amount of the adjusting screw member.

3. The coordinate detector as claimed in claim 2, wherein the elastic member is disposed between the adjusting screw member and the light sensor units, the elastic member being configured to press a head part of the adjusting screw member in an axial direction of the adjusting screw member, and wherein when the pressing of the adjusting screw member is released, each light sensor units is displaced in a direction in which the light sensor units move away from the frame of the display part.

4. The coordinate detector as claimed in claim 1, wherein the sensor position adjusting unit further includes an exterior cover member covering the adjusting screw member, the exterior cover member being provided with a tool inserting hole, and wherein a screw amount of the adjusting screw member is adjusted by inserting a tool into the tool inserting hole.

5. The coordinate detector as claimed in claim 1, wherein each of the light sensor units includes a light emitting-receiving sensor configured to emit light with respect to the optical reflective members, and receive reflected light from the optical reflective members; and
a bracket configured to support the light emitting-receiving sensor, wherein
the adjusting screw member is inserted into the bracket to adjust a gap between the bracket and the frame.

6. An electronic information board system, comprising:
the coordinate detector as claimed in claim 1;
the display part including the display surface to be touched by a target to be detected;
the frame formed by laterally enclosing four sides of the display surface of the display part; and
an operation unit configured to use a triangulation method to compute coordinate positions at which the reflected light from the remaining three sides of the frame fails to be received by the light sensor units disposed at opposite ends of the side of the display part of the frame.

7. The electronic information board system as claimed in claim 6, further comprising:
a determination unit configured to cause the coordinate detector to determine whether an image of light emitted from the light sensor units falls inside a control window of each of the optical reflective members.

8. The electronic information board system as claimed in claim 7, further comprising:
a control unit configured to adjust the respective roll directions of the light sensor units based on the determination result of the determination unit.

* * * * *